US012362919B2

(12) United States Patent
Tonry et al.

(10) Patent No.: US 12,362,919 B2
(45) Date of Patent: Jul. 15, 2025

(54) ENFORCING ACCESS CONTROL FOR EMBEDDED CONTROLLER RESOURCES AND INTERFACES

(71) Applicant: Dell Products L.P., Round Rock, TX (US)

(72) Inventors: Richard M. Tonry, Georgetown, TX (US); Adolfo S. Montero, Pflugerville, TX (US); Nikolay Kalaichidi, Austin, TX (US); Venkata Ramakrishna Rao Atta, Hyderabad (IN)

(73) Assignee: Dell Products, L.P., Round Rock, TX (US)

( * ) Notice: Subject to any disclaimer, the term of this patent is extended or adjusted under 35 U.S.C. 154(b) by 361 days.

(21) Appl. No.: 17/897,453

(22) Filed: Aug. 29, 2022

(65) Prior Publication Data

US 2024/0073007 A1    Feb. 29, 2024

(51) Int. Cl.
*G06F 21/00* (2013.01)
*H04L 9/08* (2006.01)
*H04L 9/32* (2006.01)

(52) U.S. Cl.
CPC .......... *H04L 9/0841* (2013.01); *H04L 9/3226* (2013.01)

(58) Field of Classification Search
CPC .......................... H04L 9/0841; H04L 9/3226
See application file for complete search history.

(56) References Cited

U.S. PATENT DOCUMENTS

| | | | |
|---|---|---|---|
| 9,418,223 B2 | 8/2016 | Page et al. | |
| 10,289,832 B2 | 5/2019 | Page et al. | |
| 10,474,589 B1* | 11/2019 | Raskin | H04L 63/10 |
| 2015/0302200 A1 | 10/2015 | Tonry et al. | |
| 2021/0218562 A1 | 7/2021 | Grobelny et al. | |
| 2021/0243594 A1* | 8/2021 | Suryanarayana | H04W 12/033 |
| 2021/0359854 A1* | 11/2021 | Braduke | G06F 21/78 |
| 2023/0315913 A1* | 10/2023 | Chandra | H04L 9/3242 726/26 |

* cited by examiner

*Primary Examiner* — Mahfuzur Rahman
(74) *Attorney, Agent, or Firm* — Larson Newman, LLP (57) ABSTRACT

An information handling system may establish a secure channel between an embedded controller and a processor, and request access to a resource of the embedded controller through the secured channel. The system may also receive a response to the request via the secure channel, wherein the response is based on the embedded controller validating whether the processor has a right to access the resource.

20 Claims, 6 Drawing Sheets

ENFORCING ACCESS CONTROL FOR EMBEDDED CONTROLLER RESOURCES AND INTERFACES

FIELD OF THE DISCLOSURE

The present disclosure generally relates to information handling systems, and more particularly relates to enforcing access control for embedded controller resources and interfaces.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may establish a secure channel between an embedded controller and a processor, and request access to a resource of the embedded controller through the secured channel. The system may also receive a response to the request via the secure channel, wherein the response is based on the embedded controller validating whether the processor has a right to access the resource.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
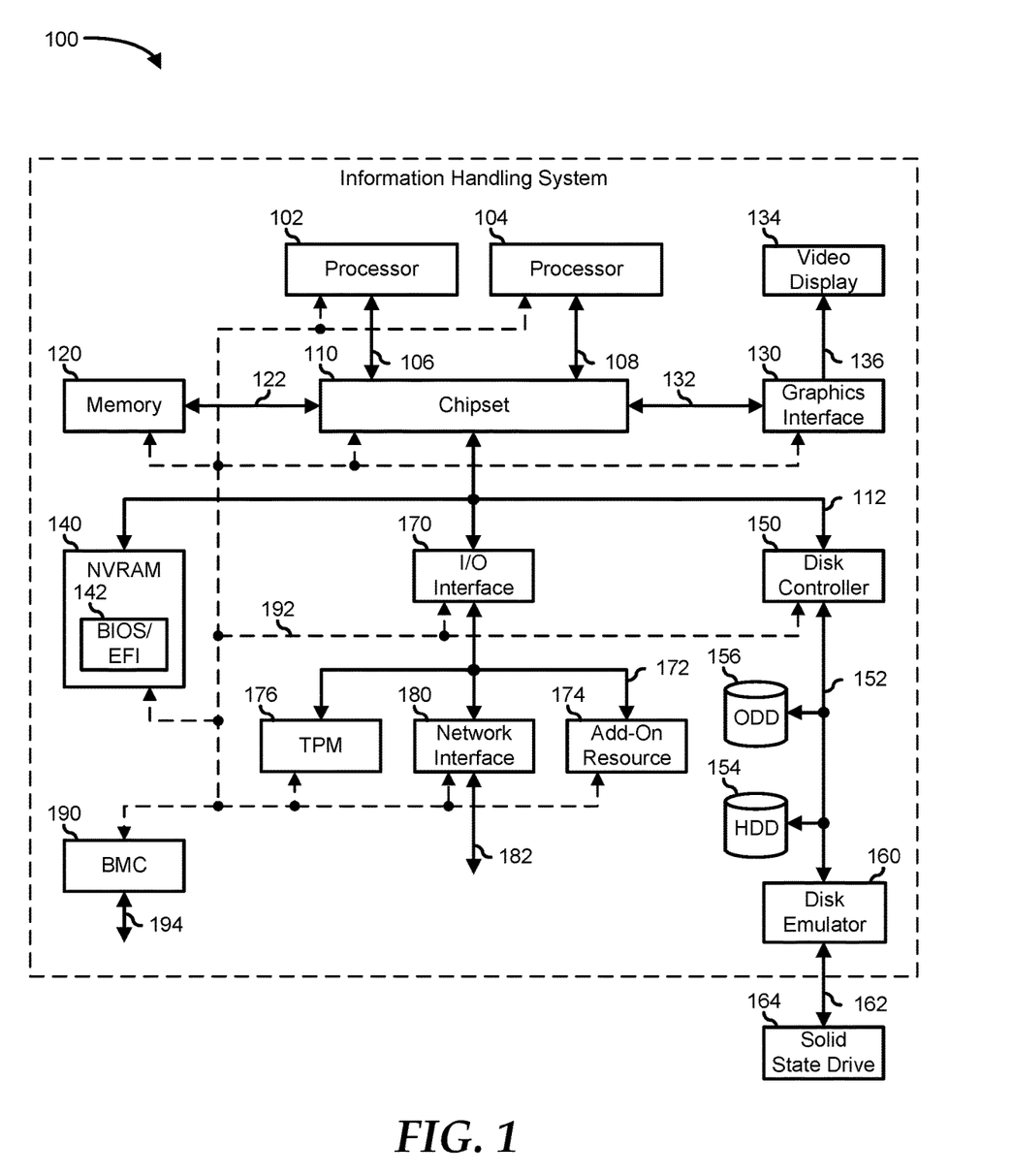
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive (ODD) 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller or service processor. A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

An embedded controller provides security features like storing sensitive data, the root of trust, etc. associated with applications running on the main processor. However, the communication interface between the main processor and the embedded controller may be in plain text and there is no control mechanism for accessing the sensitive data. To address these and other issues, the present disclosure provides security features to the embedded controller, such as encryption of the data that goes through the communication channel between the embedded controller and the main processor. In addition, the present disclosure provides an access control mechanism to access the stored sensitive data.

Figure 2:
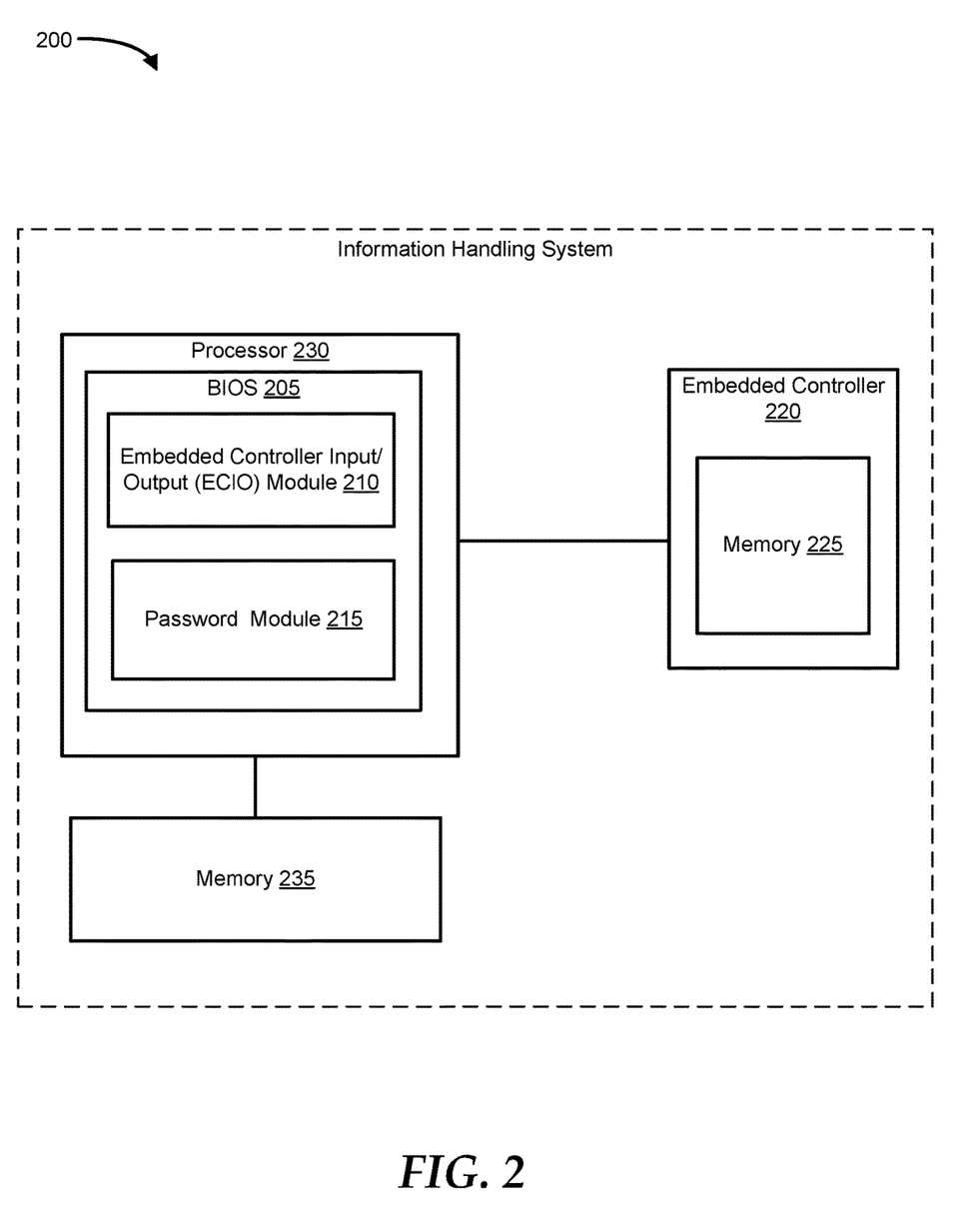
FIG. 2 is a block diagram illustrating an information handling system for enforcing access control for embedded controller resources and interfaces, according to an embodiment of the present disclosure.

FIG. 2 shows an information handling system 200 for enforcing access control for embedded controller resources and interfaces. Information handling system 200, which is similar to information handling system 100 of FIG. 1, includes a BIOS 205, an embedded controller 220, a processor 230, and a memory 235. BIOS 205 includes an embedded controller I/O (ECIO) module 210 and a password module 215. The components of information handling system 200 may be implemented in hardware, software, firmware, or any combination thereof. The components shown are not drawn to scale and information handling system 200 may include additional or fewer components. In addition, connections between components may be omitted for descriptive clarity. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

BIOS 205, which is similar to BIOS/EFI 142 of FIG. 1, is communicatively coupled to embedded controller 220. BIOS 205 refers to the pre-boot firmware that the main processor executes at the beginning of every boot and any code that remains resident at runtime that was deployed by BIOS 205. For purposes of this disclosure, EFI and unified EFI (UEFI) are used interchangeably and called UEFI for simplicity. Also as used herein, legacy BIOS, as well as UEFI BIOS, are referred to as BIOS for simplicity. BIOS 205 may use a memory similar to NV-RAM 140 of FIG. 1, for storing and exchange of data, such as a hash of a BIOS administrator password. The BIOS administrator password is an authorization mechanism utilized by BIOS 205 during the communication process with embedded controller 220. The BIOS administrator password can be set by a user through a BIOS setup.

Password module 215 may be configured to enforce authorization, such as via the BIOS administrator password. For example, password module 215 may determine whether the logged-in user is a BIOS administrator or not. If the user is a BIOS administrator, then password module 215 provides access to previously registered BIOS modules.

Embedded controller 220, which is similar to BMC 190 of FIG. 1, may be a motherboard component of information handling system 200 and may include one or more logic units for providing various core functions of information handling system 200. An example of embedded controller 220 includes an advanced configuration and power interface (ACPI) based service processor, or the like. A secure tunnel, also referred to as a secure communication channel or simply a secure channel, provides a secure and encrypted connection between embedded controller 220 processor 230. Processor 230 may be the main processor of information handling system 200 similar to processor 102 and processor 104 of FIG. 1.

The secure tunnel may be similar to management interface 192 of FIG. 1. As such, embedded controller 220 uses the secure tunnel to communicate with various software and/or firmware on the main processor such as BIOS 205 and ECIO module 210. The secure tunnel may be created using a key exchange method, such as Diffie-Hellman key exchange, every boot cycle of information handling system 200. The cryptographic keys generated and/or derived using the key exchange method may be stored in memory 235 and/or memory 225. For example, the cryptographic keys generated and/or derived by BIOS 205/ECIO module 210 may be stored in memory 235 while the cryptographic keys generated and/or derived by embedded controller 220 may be stored in memory 235 or memory 225.

Memory 225 represents a data storage capacity associated with embedded controller 220. Memory 225 can be a memory internal to or integrated with embedded controller 220. Memory 225 can also be external to embedded controller 220 or can include an integrated memory portion and an external memory portion. Memory 225 may be used to store a resource or data associated with embedded controller 220, such as an immutable attribute. For example, a hash of the BIOS administrator password which may be used in validating the BIOS administrator password from password module 215 may be stored in memory 225. Other data or resources such as variables, attributes, and or instructions may also be stored in memory 225.

Memory 235 is a secure memory, such as a secure portion of the system's memory, to protect it from unauthorized access. The secure memory may be any suitable memory block that is designed to be tamper protected including but not limited to a secure management mode memory, system management RAM, replay protected memory block, and the like. In addition to the cryptographic keys, the secure memory may be configured to store other sensitive data such as a root of trust, biometrics, etc. Memory 235 and memory 225 may include any system, device, or apparatus configured to retain program instructions and/or data for a period of time. Memory 235 and memory 225 can include volatile memory such as RAM, non-volatile memory, such as a flash memory device, or a combination thereof. For example, memory 235 and memory 225 can include an EEPROM, PCMCIA card, flash memory, ECIO module 210 may be responsible for I/O communication between embedded controller 220 and other components. For example, ECIO module 210 may be configured to run as a gateway on the main processor's side for BIOS 205 and the other BIOS modules to communicate with embedded controller 220. During the boot process, ECIO module 210 may initiate a session with embedded controller 220 using a key exchange algorithm, such as the Diffie-Hellman key exchange algorithm. When data is exchanged between BIOS 205 and embedded controller 220, the initiator of the data exchange may encrypt the payload using a cryptographic key and transmit the encrypted payload, which may include a binary large object (BLOB) over a physical media. Upon receipt, the receiver may decrypt the encrypted payload using a cryptographic key and validate the decrypted payload. The cryptographic may be generated and/or derived using the key exchange method.

Once the secure tunnel may be created, BIOS 205 may use this secure tunnel to access a resource stored in an embedded controller store, such as memory 225. To access the resource, BIOS 205 may submit a BIOS administrator password or a hash of the BIOS administrator password to embedded controller 220 over the secure tunnel. Upon receipt, embedded controller 220 may validate the BIOS administrator password or the hash of the BIOS administrator password against the stored hash of the BIOS administrator password in memory 225, which is a secure internal storage of embedded controller 220.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
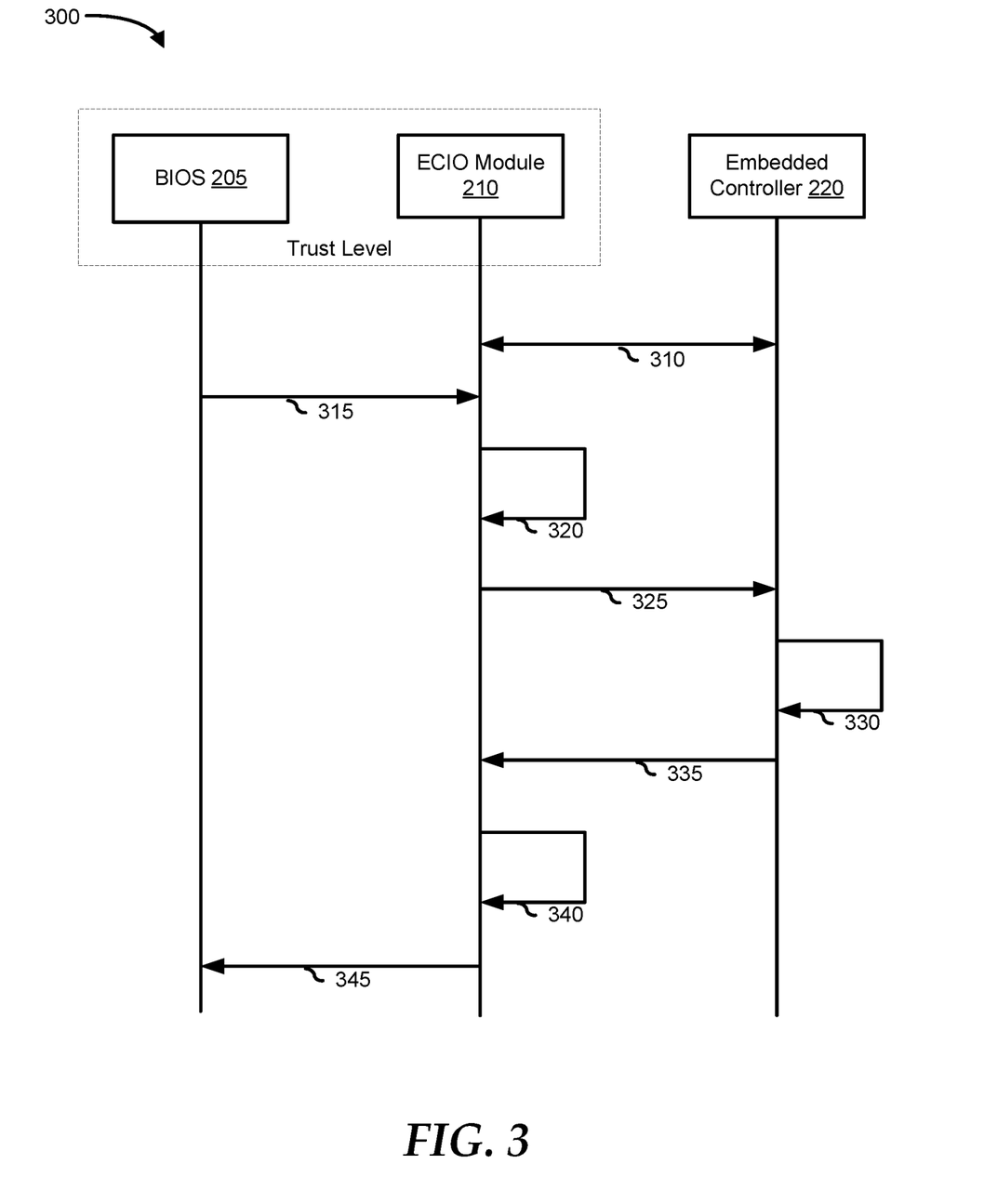
FIG. 3 is a diagram illustrating a method for establishing a secure tunnel between an embedded controller and the main processor of an information handling system, according to an embodiment of the present disclosure.

FIG. 3 shows a method 300 for establishing a secure tunnel between an embedded controller and the main processor of an information handling system. Method 300 may be performed by BIOS 205, ECIO module 210, and embedded controller 220. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

During a system reset or power-on of an information handling system, the boot process is initiated, which may include establishing the secure tunnel between embedded controller 220 and the main processor at operation 310. Establishing the secure tunnel is typically initiated by ECIO module 210. Further, the secure tunnel may be established using a key exchange method, such as the Diffie-Hellman key exchange. Using the key exchange method, BIOS 205/ECIO module 210 and embedded controller 220 may share a shared secret cryptographic key over an insecure channel. This key can be used to encrypt communications using a symmetric-key cipher. Because the key exchange is performed at each boot, the shared secret key may be different at each boot. The cryptographic keys may be stored in secure memory. For example, the private cryptographic key of BIOS 205 may be stored in memory 235 and the private cryptographic key of embedded controller 220 may be stored in memory 225 each along with the shared secret key. Other features and variations can be implemented, if desired and related systems can be utilized, as well.

At operation 315, BIOS 205 initiates a request to embedded controller 220 via ECIO module 210, wherein the request includes a registration to access secure resources. As shown herein, BIOS 205 and ECIO module 210 may be on the same trust level or security level which can be pre-established as part of a system configuration of the information handling system during manufacture. For example, BIOS 205 and ECIO module 210 may have been granted the same permissions. The request may include a globally unique identifier (GUID) associated with BIOS 205. The GUID may be static and registered embedded controller 220 during the binary build. The request may also include a digital certificate.

At operation 320, ECIO module 210 may encrypt the request transmitted by BIOS 205 using a cryptographic key generated at operation 310. At operation 325, ECIO module 210 transmits the encrypted request to embedded controller 220 over a physical media, such as a memory-mapped I/O or management interface 192 of FIG. 1. At operation 330, upon receipt of the encrypted request, embedded controller 220 may decrypt the encrypted request using a derived key from operation 310. Embedded controller 220 may also prepare a response for the decrypted request and encrypts the response. In addition, embedded controller 220 may verify the certifying authority's signature in the digital certificate received from ECIO module 210.

At operation 335, embedded controller 220 transmits the encrypted response to ECIO module 210. Embedded controller 220 may use a cryptographic key generated at operation 310. The response may also include the shared secret key. Upon receipt of the encrypted response, ECIO module 210 decrypts the response at operation 340. At operation 345, ECIO module 210 transmits the decrypted response to BIOS 205. In another embodiment, instead of encrypting the requests and responses as outlined above, the initiator may encrypt and decrypt the payload included in the requests and responses.

Figure 4:
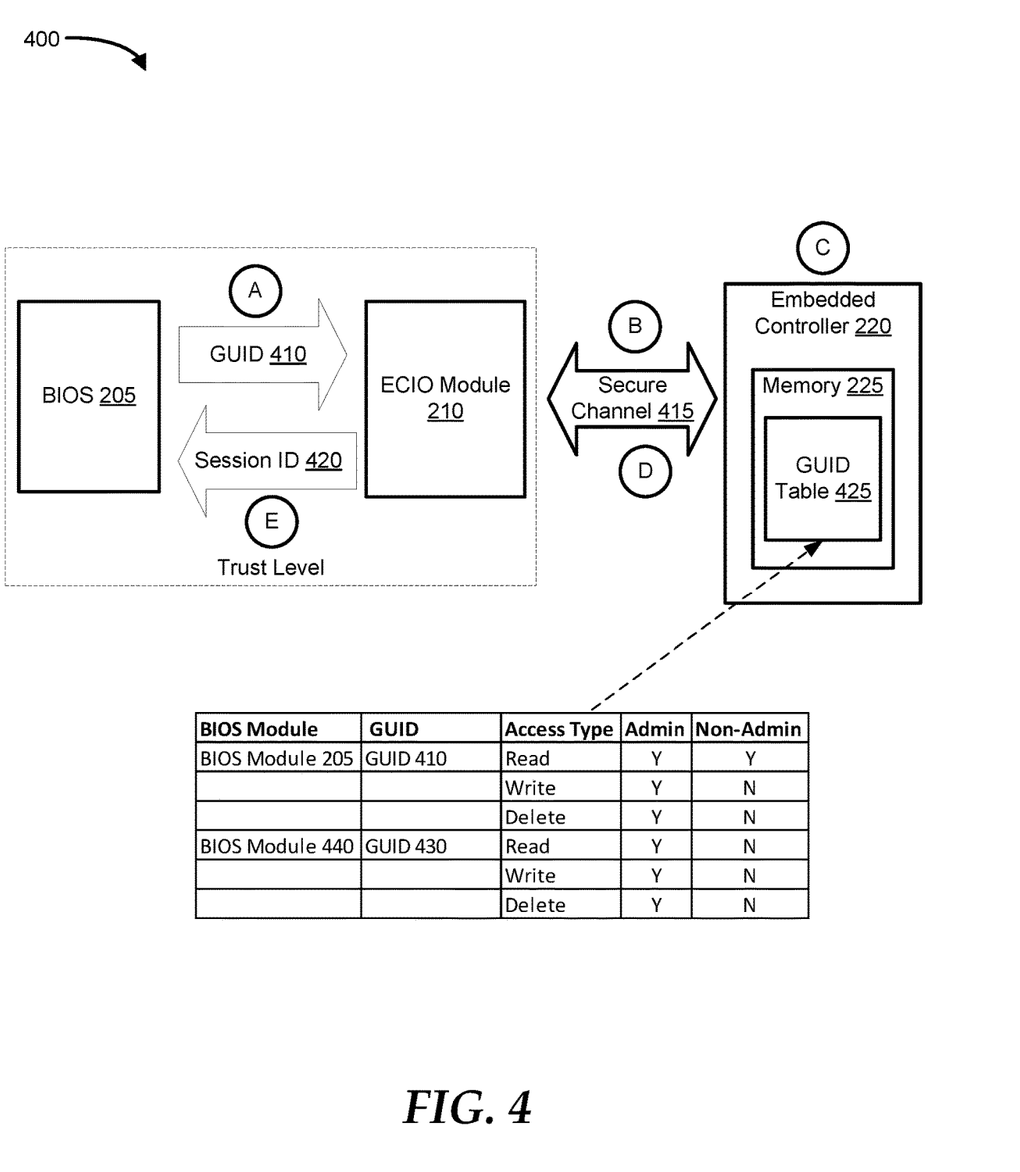
FIG. 4 is a diagram illustrating a system for requesting a session identifier from the embedded controller, according to an embodiment of the present disclosure.

FIG. 4 shows a block diagram of a system 400 for requesting a session identifier from the embedded controller. Requesting for the session identifier may be performed during the driver execution environment phase of the boot process. As such, the session identifier associated with the BIOS is different at each boot. System 400 includes BIOS 205, ECIO module 210, and embedded controller 220. FIG. 4 is annotated with a series of letters A, B, C, D, and E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, BIOS 205 may request a session identifier from embedded controller 220 210 by sending its pre-defined GUID 410 to embedded controller 220 via ECIO module 210. GUID 410 may be transmitted via a BLOB in the request. At stage B, ECIO module 210 may encrypt the request and send the encrypted request to embedded controller 220 via a secure channel 415. ECIO module 210 may use a cryptographic key associated with BIOS 205. Secure channel 415 was established during the PEI phase of the boot process as shown in FIG. 3. ECIO module 210 may encrypt the BLOB that contains GUID 410 and send the encrypted BLOB to embedded controller 220.

At stage C, embedded controller 220 may decrypt the encrypted request and validate GUID 410 against a static predefined GUID of BIOS 205 stored in a GUID table 425 in memory 225 using a derived or generated cryptographic key of FIG. 3, wherein GUID table 425 is a static table stored in memory 225. For example, embedded controller 220 may determine if GUID 410 is associated with BIOS 205. After embedded controller 220 successfully validates GUID 410, embedded controller 220 generates a session identifier 420. Session identifier 420 may be valid for that particular boot session. As such, another session identifier may be generated when information handling system 200 is rebooted. Embedded controller 220 may validate GUID 410 once and any further request for the same GUID may be treated as an error, such as a fatal error.

At stage D, embedded controller 220 may transmit an encrypted response to BIOS 205 via ECIO module 210. For example, embedded controller 220 may encrypt a BLOB that includes session identifier 420 which is then included in the response. At stage E, ECIO module 210 may decrypt the encrypted response received from embedded controller 220 and sends session identifier 420 to BIOS 205. ECIO module 210 may use a derived or generated cryptographic key from FIG. 3.

Figure 5:
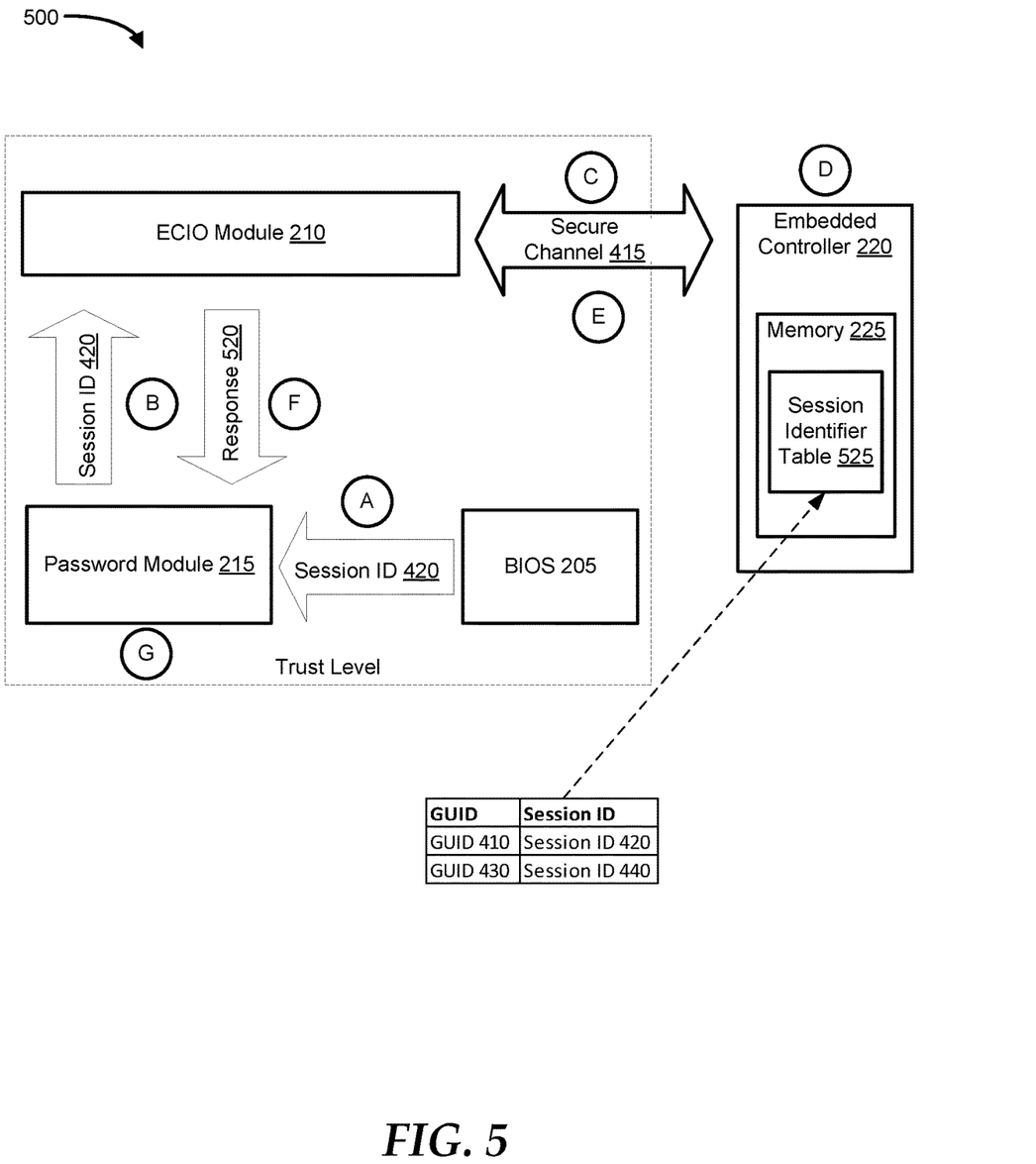
FIG. 5 is a diagram illustrating a system for requesting access to a BIOS password, according to an embodiment of the present disclosure.

FIG. 5 shows a block diagram of a system 500 for requesting access to a BIOS password. System 500 includes BIOS 205, ECIO module 210, password module 215, and embedded controller 220. FIG. 5 is annotated with a series of letters A, B, C, D, E, F, and G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

In one example, a user and/or BIOS 205 may perform an operation that requires authorization, such as changing a BIOS or configuration setting. The user may be prompted to enter a password such as the BIOS administrator password which may then be validated against a hash of the BIOS administrator password stored by embedded controller 220 at memory 225. At stage A, BIOS 205 may send session identifier 420 to password module 215 when requesting access to a password hash, such as the hash of BIOS administrator password, to validate the password entered by the user at a BIOS user interface. Session identifier 505 may be session identifier 420 received by BIOS 205 in FIG. 4.

At stage B, password module 215 may send session identifier 420 to embedded controller 220 through ECIO module 210 for validation. At stage C, ECIO module 210 may send session identifier 505 over encrypted secure channel 415. ECIO module 210 may encrypt the request and/or the BLOB that includes session identifier 505 before transmission.

At stage D, embedded controller 220 may decrypt and validate session identifier 420 using session identifier table 525 at memory 225. For example, embedded controller 220 may validate whether session identifier 420 is associated with GUID 410. At stage E, embedded controller 220 may transmit a response to BIOS 205 through ECIO module 210 via secure channel 415. For example, embedded controller 220 may encrypt a BLOB that includes a status of the session identifier validation using a cryptographic key generated at FIG. 3. The status may be set to "valid" or "not valid" based on whether session identifier 505 has been successfully validated or not. For example, the status may be set to one if the session identifier is valid or zero if the session identifier is not valid.

At stage F, ECIO module 210 may decrypt the encrypted response and transmit the decrypted response 520 to password module 215. ECIO module 210 may use a derived or cryptographic key from FIG. 3. At stage G, password module 215 may register session identifier 420. For example, password module may store session identifier 420 as a registered session identifier for password access. The registration of session identifier 420 allows password module 215 to share the password hash, such as the hash of the BIOS administrator password when requested in association with session identifier 420 without validating it first with embedded controller 220. This may be true during the current boot session.

Figure 6:
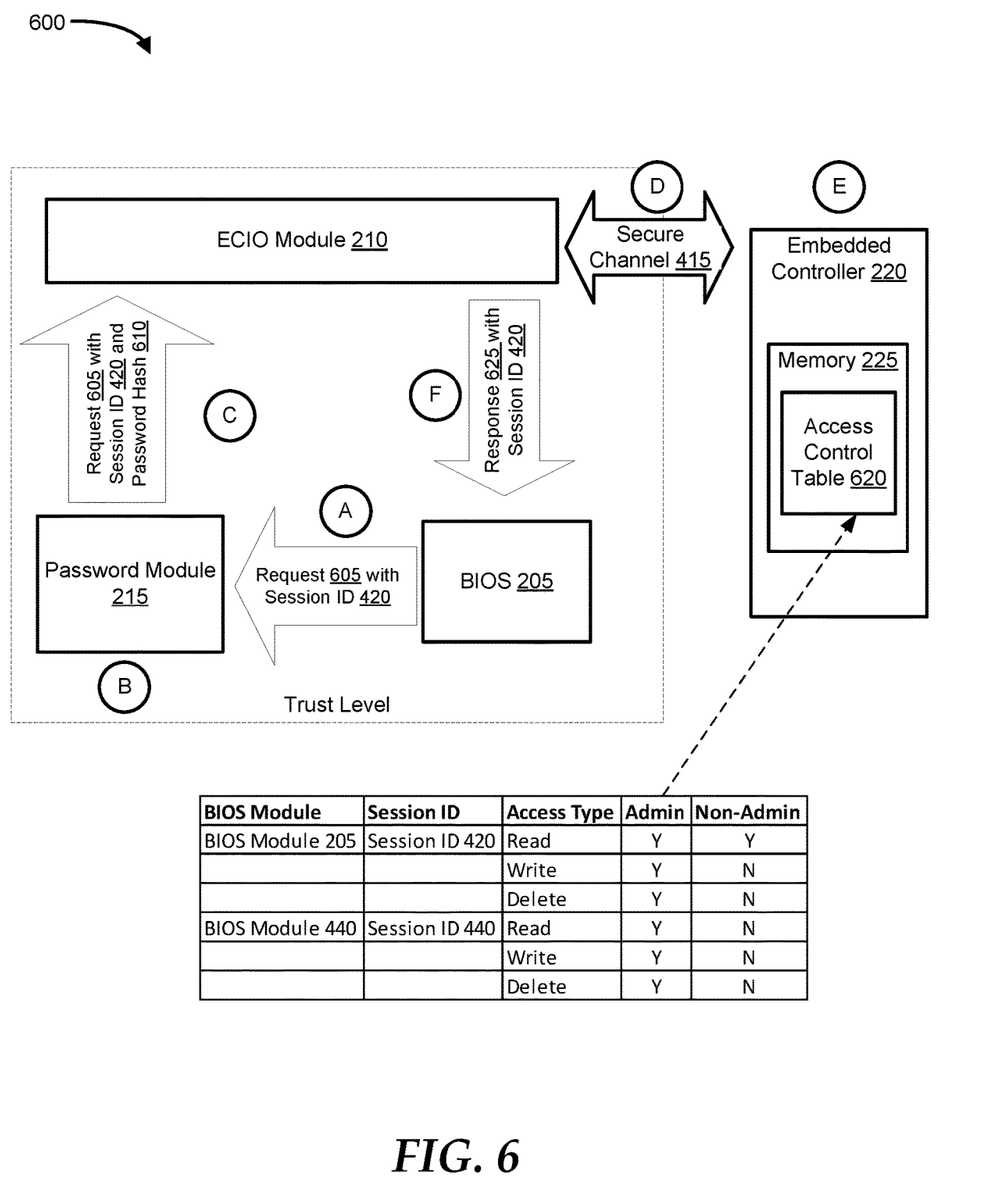
FIG. 6 is a diagram illustrating a system for requesting access to a resource, according to an embodiment of the present disclosure.

FIG. 6 shows a block diagram of a system 600 for requesting the embedded controller for access to a resource. The resource may be stored in a memory associated with the embedded controller. System 600 includes BIOS 205, ECIO module 210, password module 215, and embedded controller 220. FIG. 6 is annotated with a series of letters A, B, C, D, E, and F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

In one example, BIOS 205 may send a request to access a particular resource at memory 225 of embedded controller 220. For example, BIOS 205 may request a variable or an attribute. As each BIOS module may have access to a different resource, the request may include a session identifier and/or GUID of the BIOS module requesting access. The request may also include a hash of a user password and information associated with the data or resource to be accessed. The user password hash may be the hash of the BIOS administrator password. As such, BIOS 205 may send the request first to password module 215 for password attestation. Embedded controller 220 may validate the password hash and determine the privileges associated with the initiator of the request. For example, embedded controller 220 may validate the password hash and determine the privileges of the user associated with BIOS 205 before granting access to the data or resource if successfully validated. Otherwise, embedded controller 220 may return an error or a "not valid" status.

At stage A, BIOS 205 may send a request 605 to password module 215. Request 605 may include a BLOB with a session identifier 420 that was generated in FIG. 4. At stage B, password module 215 may validate if session identifier 420 is valid. If session identifier 420 is valid, then password module 215 may add password hash 610 to request 605. Password hash 610, which may be the hash of the BIOS administrator password or a non-administrative user, may be added to a BLOB that includes session identifier 420. If session identifier 420 is not valid, then password module 215 may issue an error event and the request ends. At stage C, password module 215 may send request 605 to ECIO module 210. At stage D, ECIO module 210 may encrypt request 605 and send the encrypted request 605 to embedded controller 220.

At stage E, embedded controller 220 receives and decrypts request 605 and may validate session identifier 420 and determine whether BIOS 205 is authorized to access the data or resource based on access control table 620, wherein access control table 620 is a runtime table in memory 225. Access control table 620 may enumerate types of access of various components, such as each of the BIOS modules. The BIOS modules may have different access types, which may also be further based on administrative and/or non-administrative privileges. For example, the BIOS administrator may have the right to read, update, and/or delete a resource while a non-administrator BIOS user may have the right to only read the resource.

Embedded controller 220 may also validate the password hash 610 against a stored hash of the BIOS administrator password stored in memory 225. If validated, then embedded controller 220 may send a response 625 to BIOS 205 through ECIO module 210 via secure channel 415. Response 625 may be encrypted and include a BLOB with session identifier 420 and the requested data or resource. Response 625 may also include a status such as whether the request was valid or not. For example, if BIOS 205 is authorized to access the data or resource, then the status may be one otherwise the status may be zero. If not validated, then embedded controller 220 may send an error or a response with the status as invalid.

Although FIG. 3, FIG. 4, FIG. 5, and FIG. 6 show examples of various operations in some implementations, FIG. 3, FIG. 4, FIG. 5, and FIG. 6 may include operations, fewer operations, different operations, or differently arranged operations than those depicted in FIG. 3, FIG. 4, FIG. 5, and FIG. 6. Those skilled in the art will understand that the principles presented herein may be implemented in any suitably arranged processing system. Additionally, or alternatively, two or more of the operations of FIG. 3, FIG. 4, FIG. 5, and FIG. 6 may be performed in parallel. For example, operation 310 and operation 315 of FIG. 3 may be performed in parallel. In addition, although the components are shown to perform the operations in FIG. 3, FIG. 4, FIG. 5, and FIG. 6 include a BIOS and ECIO module, any software or firmware running on the main processor may utilize the secure channel and key exchange method when communicating with the embedded controller.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM- CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   establishing, by a processor, a secure channel between an embedded controller and the processor using a key exchange method during a boot process, wherein the establishing of the secure channel using the key exchange method includes sharing a cryptographic key;
   sending an access request to a resource of the embedded controller through the secure channel, wherein the access request is encrypted using the cryptographic key; and
   receiving a response to the access request via the secure channel, wherein the response is based on the embedded controller validating whether the processor has a right to access the resource.

2. The method of claim 1, wherein the key exchange method is a Diffie-Hellman key exchange method.

3. The method of claim 1, wherein the establishing of the secure channel is performed during a pre-extensible firmware interface initialization phase of the boot process.

4. The method of claim 1, further comprising requesting a session identifier from the embedded controller.

5. The method of claim 4, wherein the requesting of the session identifier is performed during a driver execution environment phase of the boot process.

6. The method of claim 1, further comprising receiving a globally unique identifier from the embedded controller.

7. The method of claim 1, wherein the access request includes a session identifier and a password hash.

8. An information handling system, comprising:
   a processor; and
   a memory device storing code that when executed causes the processor to perform operations, the operations including:
      establishing a secure channel between an embedded controller and the processor using a key exchange method during a boot process, wherein the establishing of the secure channel using the key exchange method includes sharing a cryptographic key;
      sending an access request to a resource of the embedded controller through the secure channel wherein the access request is encrypted using the cryptographic key; and
      receiving a response to the access request via the secure channel, wherein the response is based on the embedded controller validating whether the processor has a right to access the resource.

9. The information handling system of claim 8, wherein the key exchange method is a Diffie-Hellman key exchange method.

10. The information handling system of claim 8, wherein the establishing of the secure channel is performed during a pre-extensible firmware interface initialization phase of the boot process.

11. The information handling system of claim 8, further comprising requesting a session identifier from the embedded controller.

12. The information handling system of claim 11, wherein the requesting of the session identifier is performed during a driver execution environment phase of the boot process.

13. The information handling system of claim 8, further comprising receiving a globally unique identifier from the embedded controller.

14. A non-transitory computer-readable medium to store instructions that are executable to perform operations comprising:
   establishing a secure channel between an embedded controller and a processor using a key exchange method during a boot process, wherein the establishing of the secure channel using the key exchange method includes sharing a cryptographic key;
   sending an access request to a resource of the embedded controller through the secure channel wherein the access request is encrypted using the cryptographic key; and
   receiving a response to the access request via the secure channel, wherein the response is based on the embedded controller validating whether the processor has a right to access the resource.

15. The non-transitory computer-readable medium of claim 14, wherein the key exchange method a Diffie-Hellman key exchange method.

16. The non-transitory computer-readable medium of claim 14, wherein the establishing of the secure channel is performed during a pre-extensible firmware interface initialization phase of the boot process.

17. The non-transitory computer-readable medium of claim 14, further comprising requesting a session identifier from the embedded controller.

18. The non-transitory computer-readable medium of claim 17, wherein the requesting of the session identifier is performed during a driver execution environment phase of the boot process.

19. The non-transitory computer-readable medium of claim 14, further comprising receiving a globally unique identifier from the embedded controller.

20. The non-transitory computer-readable medium of claim 14, wherein the access request includes a session identifier and a password hash.

* * * * *